United States Patent [19]
Bryson

[11] Patent Number: 5,556,901
[45] Date of Patent: Sep. 17, 1996

[54] POLYSILANE-BASED COMPOSITION

[75] Inventor: Nathan J. Bryson, Grigny, France

[73] Assignee: Flamel Technologies, France

[21] Appl. No.: 117,061

[22] PCT Filed: Jan. 14, 1993

[86] PCT No.: PCT/FR93/00040

§ 371 Date: Nov. 2, 1993

§ 102(e) Date: Nov. 2, 1993

[87] PCT Pub. No.: WO93/14164

PCT Pub. Date: Jul. 22, 1993

[30] Foreign Application Priority Data

Jan. 15, 1992 [FR] France ................................. 92 00369
Sep. 25, 1992 [FR] France ................................. 92 11724

[51] Int. Cl.$^6$ .............................. C08K 5/34; C04B 35/52
[52] U.S. Cl. ........................ 524/99; 524/102; 524/130; 524/173; 501/88; 501/90
[58] Field of Search ............................ 524/99, 102, 130, 524/173; 501/88, 90, 92

[56] References Cited

U.S. PATENT DOCUMENTS 5,025,048   6/1991   Barnier ........................................ 524/99

FOREIGN PATENT DOCUMENTS 0123934   11/1984   European Pat. Off. .
0251678    1/1988   European Pat. Off. .
0382651    8/1990   European Pat. Off. .
2222170    2/1990   United Kingdom .

Primary Examiner—John C. Bleutge
Assistant Examiner—Karen A. Dean
Attorney, Agent, or Firm—Bacon & Thomas

[57] ABSTRACT

The subject-matter of the present invention is to solve the technical problem resulting from the instability in air of polysilanes. For this purpose, it proposes a polysilane-based composition, used particularly for producing silicon carbide, comprising:

polysilane chains capable of being degraded by oxidation and the formation of polysiloxane-type products and/or polysilane chains suitable for being bound together directly by a reaction between Si—H and Si—X radicals, and/or indirectly through the intermediary of a crosslinking additive and by a reaction between A—X and A—H radicals, X being an olefin radical, preferably comprising 1 to 18 carbon atoms and, more preferably still, being constituted by a vinyl radical (Vi:—CH=CH$_2$), A being an organic, organosilicic or silicic radical;

and at least one antioxidant system.

27 Claims, 1 Drawing Sheet

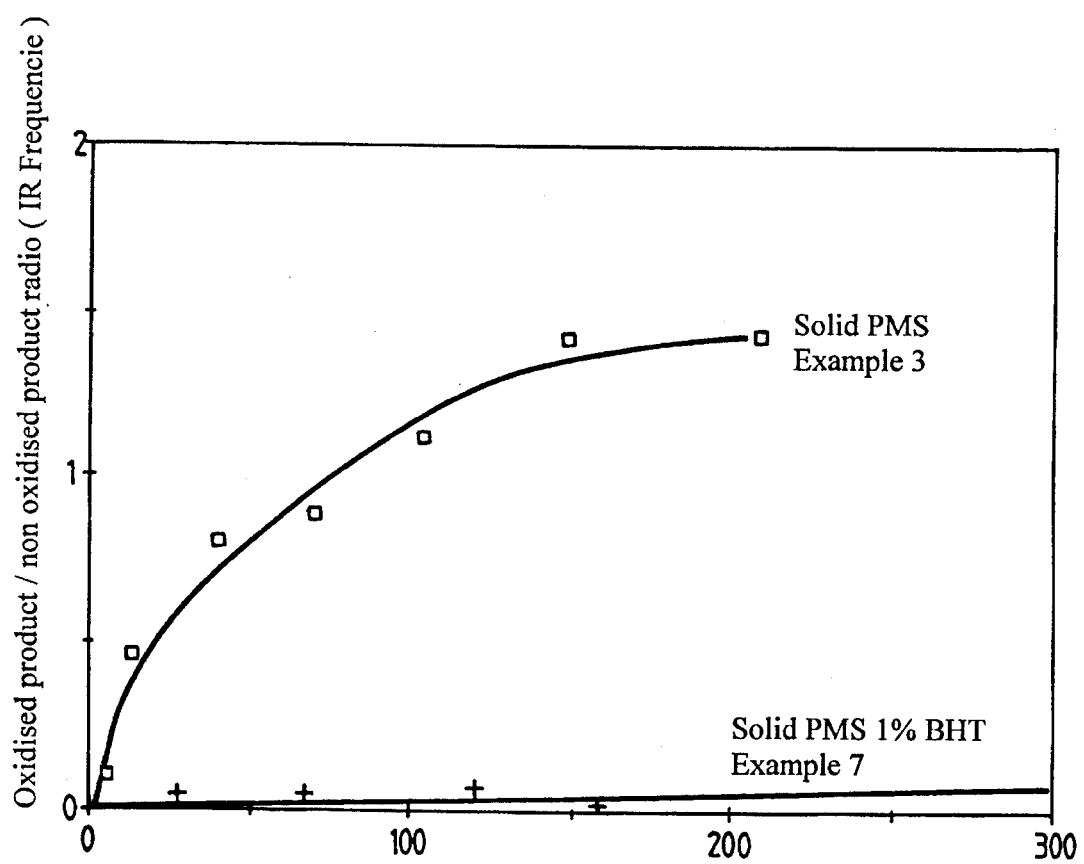

POLYSILANE-BASED COMPOSITION

FIELD OF TECHNOLOGY

The present invention concerns polysilane-based compositions which are particularly useful for producing silicon carbide. The field of the invention is that of the stabilisation in air, particularly in oxygen, and/or at a temperature, of such polysilane-based compositions or mixtures of polysilanes.

Polysilanes are polymeric materials, the linear skeleton of which is constituted by silicon atoms connected together. These silicon-rich materials have been applied in numerous technical fields. They are used in the industries of electronics and composites, particularly as photoconductors, semiconductors, materials constituting the image in xerography and microlithography and, as indicated above, as ceramic precursors in silicon carbide (CHEM. REV. 1989, 89, 1410).

More specifically, polysilanes are thus mainly used:

- to produce complex forms and pyrolyse them in order to transform them into ceramics,
- to spin continuous fibres and transform them, by heat treatment, into ceramic fibres,
- to prepare composite ceramic materials (to this end, the polysilane composition is used as a matrix, with carbon or ceramic fibres or, as a binder, with ceramic powders),
- to prepare oxidation-resistant coatings (oxidisable materials, such as composite carbon-carbon materials or carbon fibres, are coated with said polysilane and the latter is pyrolysed), as materials for filling the pores of a porous ceramic material, and with the aim of improving the mechanical properties of such a material,
- to produce fine ceramic films for use in electronics.

PRIOR ART

Polysilanes can be obtained in various ways such as, for example, by condensing halogenosilanes such as chlorosilanes with alkaline metals, as described in patents U.S. Pat. Nos. 4,783,516 and 4,537,942, as well as in the publication CHEM. REV. 1989, 89 (6), 1359, or by coupled dehydrogenation reactions involving catalysts, as described in the publications J. AMER. CHEM. SOC. 1986, 108, 40/59 or J. ORGANO-METALLIC CHEM., 1985, 2079, C11, or by redistribution reactions, as disclosed in patents U.S. Pat. Nos. 4,814,919 and 4,310,651, or else by chemical modification of simple polysilanes as described, in particular, in the publication POLYM. REPRINTS, 1987, 28, 222.

The polysilanes considered in the context of the present invention are those having the general formula:

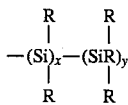

in which the R groups can be identical or different, independent from one another along the whole length of the polymer chain and chosen from the following groups:

- hydrogen
- aliphatic, linear, branched or cyclic hydrocarbonated groups having 1 to 10 carbon atoms,
- aromatic, alkyl or aralkyl groups, substituted where appropriate by functional groups containing nitrogen, oxygen, phosphorus or boron
- silicon or organo-silicon groups,
- unsaturated olefin groups having 1 to 18 carbon atoms, x and Y being chosen so as to obtain a polymer having an average molecular weight greater than 50 units of mass.

The present invention concerns, more particularly, polysilanes having on their skeleton hydrogen groups (Si—H) and/or olefin groups preferably having 1 to 18 carbon atoms and, more preferably still, a further 2 carbon atoms, this corresponding to the vinyl group (Vi:—CH=$CH_2$).

By way of example, the following may be cited:
- polyalkylhydrogensilanes including, in particular, polymethylhydrogensilanes, hereinafter termed PMSs,
- polyvinylhydrogensilanes or polyvinylhydrogenmethylsilanes, having hydrogen and vinyl groups in their skeleton and hereinafter termed PVSs.

PMSs are described in patent U.S. Pat. No. 4,537,942 and PVSs in patent U.S. Pat. No. 4,783,516.

In all applications of polysilanes involving crosslinking, including in particular ceramisation, and which are those with which the present invention is concerned in preference, it is necessary to constitute polysilane chains reactive by hydrosilylation.

Hydrosilylation is a radicalar addition reaction involving a hydrogen group (Si—H) and an olefin group (Si—Vi).

The compositions used in these applications must therefore include polysilane chains comprising at least two hydrogen and/or olefin groups per molecule.

According to a variant, use may be made of crosslinking additives (or bridging agents) of the organic or organosilicic compound type, with or without a polymeric structure and also comprising at least two hydrogen and/or olefin groups per molecule.

Consequently, all the polysilanes with which the invention is concerned, including in particular PVS and PMS, are subject to unwanted oxidation (Si—H) and/or crosslinking (Si—H with Si—Vi) reactions in the presence of air.

In contact with the ambient air (and therefore with oxygen), PMS polymethylsilanes are subject to rapid incorporation of oxygen within the polymer skeleton, which leads to polysiloxane-type products $(MeHSiO)_n$. Such parasite products are quite undesirable when it is intended to ceramise the polysilane by pyrolysis. Furthermore, in some cases, this rapid oxidation can even lead to spontaneous combustion of the polymer.

This reactivity of PMS in regard to oxygen can initiate radicalar hydrosilylation reactions in PMS/PVS, PMS/olefin crosslinking additive mixtures and lead to premature crosslinking of the mixture in the ambient air. This means that the polymer solidifies and becomes insoluble with the incorporation of oxygen, which makes it impossible to handle and use the polymer subsequently.

As concerns PVSs, which contain hydrogen and vinyl groups in the same molecule, these are likely to react in the ambient air and/or at high temperatures by hydrosilylation, leading to premature, unwanted solidification of the product. In the same way as for PMSs, this rapid oxidation and crosslinking can, in some cases, induce spontaneous combustion of the polymeric composition.

There is obviously, therefore, a problem with the stability of polysilanes with regard to air, and indeed with regard to temperature, where they contain olefin groups and, in particular, vinyl groups. This major disadvantage represents an important deterrent to developments in the techniques of preparing ceramics with silicon carbide using polysilanes, given that handling has to take place in an inert atmosphere, which constitutes a very awkward constraint.

One of the essential aims of the present invention is to reduce these difficulties by providing a polysilane-based composition to be used particularly in obtaining silicon carbide, which is stable in the atmosphere and at ambient temperature.

Another aim of the invention is to provide a composition with which high ceramisation yields can be achieved during the subsequent preparation of ceramics made of silicon carbide.

PRESENTATION OF THE INVENTION

Thus, after long and laborious research, the Applicant has demonstrated, in an absolutely surprising and unexpected way, that the sensitivity to air of polysilanes can be greatly reduced, and even eliminated, by association with at least one antioxidant system, present in an effective and relatively low quantity.

It is easy to see the usefulness of the present invention, particularly with regard to the synthesis, storage and implementation of said polysilanes, which are thereby facilitated.

DRAWING

The single FIGURE is a draft which shows the ratio of oxidized product to non-oxidized product relative to time for the materials of Examples 3 and 7.

THE BEST WAY OF IMPLEMENTING THE INVENTION

The subject-matter of the present invention is therefore the stabilisation of polysilane-based compositions, used particularly for producing silicon carbide, comprising:

polysilane chains capable of being degraded by oxidation and the formation of polysiloxane-type products and/or polysilane chains suitable for being bound together directly by a reaction between Si—H and Si—X radicals, and/or indirectly through the intermediary of a crosslinking additive and by a reaction between A—X and A—H radicals, X being an olefin radical, preferably comprising 1 to 18 carbon atoms and, more preferably still, being constituted by a vinyl radical (Vi:CH=CH$_2$), A being an organic, organosilicic or silicic radical, and at least one antioxidant system.

In accordance with the invention, the antioxidant system is constituted by at least one antioxidant compound chosen from those used in the chemistry of silicon-free organic polymers, of the type exemplified in:

HANDBOOK OF POLYMER SCIENCE AND TECHNOLOGY, Ed. Cheremisinoff, Vol. 2, Chap. 9, pp 261–290,

POLYM. DEGRAD. AND STABILITY 1991, 34, 1,

J. Pospisil in ADVANCES IN POLYM. SCI., Vol. 101, pp 66–180.

Among the chemical families of preferred antioxidants, mention may be made of phenols, olefins or amines, phenols being particularly preferred.

A solution has therefore been found to the problem of the stability of polysilanes capable of being degraded prematurely by hydrosilylation in contact with air and at ambient temperature, but also to that of protection against the oxidation of polysilanes (subject to the undesirable incorporation of oxygen into their molecules) (formation of polysiloxanes before or during subsequent ceramisation treatment by pyrolysis).

This result is, to say the least, astonishing in so far as these antioxidants are known to inhibit oxidation, and also radicalar reactions, such as the crosslinking of polysilanes which must preferably take place just before ceramisation, as will be seen later.

In these circumstances, it could therefore be feared that the use of these radicalar inhibitors, which is what the antioxidant compounds in question are, seriously impair this stage of crosslinking, on which the yield of polysilanes being converted into silicon carbide depends greatly.

It is therefore to the merit of the Applicant that it has been able to proceed with this demonstration and has thus overcome a particularly unfavourable technical prejudice.

The effectiveness of the antioxidant system varies as a function of its concentration in the polysilane composition and its intrinsic reactivity which depends on the nature of the functional groups forming its structure.

The present invention makes it possible to store and use polysilane in the ambient air, in the pure state or in solution, without the risk of solidification and/or impairment by the formation of polysiloxane.

The present invention also provides polysilane compositions particularly well suited to possible subsequent ceramisation transformations and which, in addition, allow high ceramisation yields to be obtained, with very limited formation of unwanted by-products.

In accordance with a preferred provision of the present invention, the antioxidant system comprises:

at least one first $C_1$ compound, termed a primary antioxidant and chosen from the family of phenols and/or amines and/or olefins, at least one second $C_2$ compound, termed a secondary antioxidant, chosen from the family of phosphorus-containing products and/or sulphurous products.

It has, indeed, been discovered that such combinations have great synergy in terms of the stabilising effects of polysilanes with regard to the oxygen in the air and improvements in the yield of ceramisation.

The nature of the $C_1$ primary antioxidants which are suited to the purposes of the invention is specified below.

PHENOLIC ANTIOXIDANTS

In compositions according to the invention, use may particularly be made of antioxidants:

from the hydroquinone family, which comply with the formula:

(I)

from the cresol family, which comply with the formula:

(II)

from the catechol family, which comply with the formula:

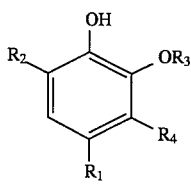

in which formulae $R_1$, $R_2$, $R_3$ and $R_4$ represent independently hydrogen or a $C_1$–$C_{18}$ carbonated group, aromatic or aliphatic, which may include reactive functions.

Dimers or polymers of these compounds themselves also constitute antioxidants, known in the prior an and capable of use for the purposes of the invention.

By way of illustration, the formulae of some of these polymeric antioxidants from the cresol family are specified below.

In said formulae, the substituents $R_5$ are identical or different, and represent hydrogen or a $C_1$–$C_{18}$ alkyl group.

For the purposes of the invention, compounds of the following formula are therefore also suitable:

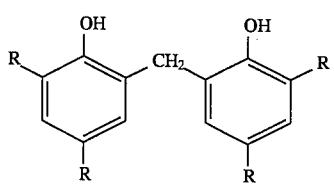

and, in particular, 2,2 methylenebis-(4,6-di-tert-butylphenol) and 2,2'-methylenebis(4-methyl-6-tert-butylphenol),

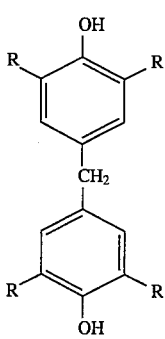

and, in particular, 4,4'-methylenebis-(2,6-di-tert-butylphenol),

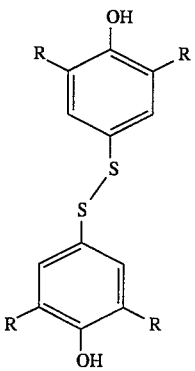

and, in particular, 3-tert-butyl-4-hydroxy-5-methylphenyl disulphide,

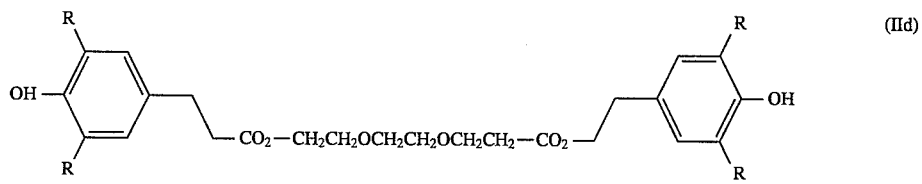

and, in particular, triethyleneglycolbis-3-(3-tert-butyl-4-hydroxy-5-methylphenyl)-3-propionate, sold under the name IRGANOX 245,

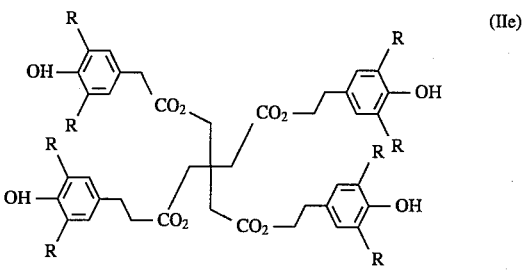

and, in particular, pentaerythrityl-tetrakis-[3-(3,5-di-tert-butyl-4-hydroxyphenyl)propionate], sold under the name IRGANOX 1010.

Among phenolic antioxidants, the following are preferred:

hydroquinone (formula (I) in which $R_1=R_2=R_3=H$), p-methoxyphenol (formula (I) in which $R_1=CH_3$, $R_2=R_3=H$), 1,2-dihydroxybenzene (or catechol) (formula (III) in which $R_1=R_2=R_3=R_4=H$), 6-tert-butyl-1,2-dihydroxybenzene (formula (III) in which $R_1=R_3=R_4=H$ and $R_2$=tert-butyl), 2,6-di-tert-butyl-4-methylphenol (or BHT) (formula (II) in which $R_1=CH_3$, $R_2=R_3$=tert-butyl), 4,4'-methylenebis-(2,6-di-tert-butylphenol) (formula (IIb) in which R=tert-butyl), triethyleneglycolbis-3-(3-tert-butyl-4-hydroxy-5-methylphenyl)-3-propionate (formula (IId) in which R=tert-butyl), pentaerythrityl-tetrakis-(3-(3,5-di-tert-butyl-4-hydroxyphenyl)propionate) (formula (IIe) in which R=tert-butyl).

BHT and its derivatives with Formula IIb, IId and IIe are particularly preferred.

OLEFIN ANTIOXIDANTS

By way of illustration, mention may be made of neo-allo-ocimene (or 2,6-dimethyl-2,4,6-octatriene).

AMINE ANTIOXIDANTS

In compositions according to the invention, use may be made in particular of antioxidants:

from the aromatic amine family, such as -β,β'-dinaphthylamine, phenothiazine, N-phenyl-2-naphthylamine, etc., from the quinoline family, which comply with the formula:

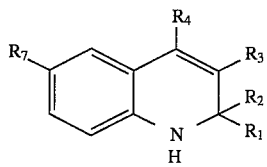

from the phenylenediamine family, which comply with the formula:

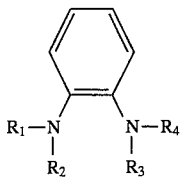

the substituents $R_1$ to $R_4$ of the two above-mentioned formulae having the same definition as that given previously, from the family of triarylamines and their derivatives, from the family of HALS amines, such as:
bis-[2,2,6,6-tetramethyl-4-piperidinyl]sebacate,
2(2'-hydroxy-3'-5'-di-t-butyl phenyl)-5-chlorobenzotriazole).

In the same way, there are polymers which are themselves antioxidants. By way of illustration, the formula of a monomer of polymers from the quinoline family, of interest for the purposes of the invention, is indicated below:

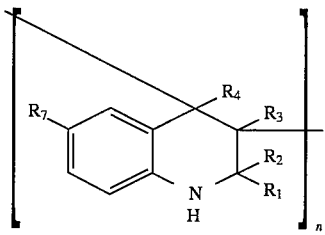

The nature of $C_2$ secondary antioxidants which are suitable for the purposes of the invention is specified below.

SULPHUROUS ANTIOXIDANTS

Sulphurous $C_2$ antioxidants preferably have one of the following general formulae:

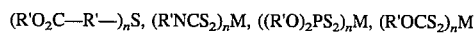

in which:

R' is an aromatic, aliphatic or aralkyl organic group having 1 to 18 carbon atoms. The R' groups can be identical or different, independent from one another in the compound. These groups are typically non-reactive and have the function of making the secondary antioxidant compatible with the polysilane in question, M is Ni, Zn or another type of metal, n is less than or equal to 2.

By way of examples of preferred sulphurous products, mention may be made, non-exhaustively, of dialkylthiodipropionate derivatives, such as dilaurylthiodipropionate, distearylthiodipropionate or metallic derivatives of dithiocarbamates, dithioxanthates or dithiophosphonates, dialkylthiodipropionate derivatives being particularly preferred.

PHOSPHORUS-CONTAINING ANTIOXIDANTS

Phosphorus-containing antioxidants of interest as $C_2$ secondary oxidants are chosen from compounds with the following general formulae:

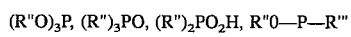

in which:

R" is an aromatic, aliphatic or aralkyl organic group having 1 to 18 carbon atoms, where the R" groups can be identical or different and independent from one another in the compound, R'" is a chelating group, preferably catechol.

These R" and R'" groups are typically non-reactive. They have the function of making the $C_2$ secondary antioxidant compatible with the polysilane in question.

Among phosphorus-containing products, preference is given to those in the following non-exhaustive list:

tri-(nonylphenyl)phosphite, triphenylphosphite, tri-t-butylphosphite, catechol-mono(2,6-di-tert-butyl-4 methylphenyl)phosphite.

Tri-(nonylphenyl)phosphite being particularly preferred because of its commercial availability and its compatibility with the polysilanes tested.

With advantage, the relative concentrations of $C_1$ primary oxidant and $C_2$ secondary, oxidant are chosen such that the $C_1/C_2$ ratio, expressed as dry weight, is comprised between 0.1 and 3.0, preferably between 0.3 and 1.2.

The concentration of antioxidant system in the composition is chosen in order to comply with a number of specific variables in a given application. The skilled person is capable of optimising the quantity of antioxidant systems to be used. In general, it is appropriate to introduce a sufficient amount of them to obtain the result sought (stabilisation for at least a given time), while taking account of the factor of economic viability which leads to minimisation of the quantities used. Furthermore, at high concentrations, the antioxidant system is likely to behave like an impurity which can modify the properties of the polymer and have negative effects on ceramisation by subsequent pyrolysis.

To give a clear idea, it may be specified that the antioxidant system is present in the composition, preferably at a rate of $10^{-5}\%$ to 10% (between 0.1 and $10^5$ ppm) by weight relative to the weight of polysilane and, more preferably still, 0.01% to 1% (between 100 and 10,000 ppm).

In any case, the performances obtained by the antioxidant system according to the invention, and in particular by the synergic combinations of $C_1$ primary antioxidants and $C_2$ secondary antioxidants, mean that the quantities introduced into the composition can be minimised.

Incorporating the antioxidant system into the polysilane-based composition may take place during or after the manufacture of said polysilanes.

In general, the antioxidant system is introduced in liquid form, for example in the form of a solution in a solvent or in a mixture of appropriate solvents.

Adding the antioxidant system, concomitantly with the synthesis of polysilanes, makes it possible to stabilise the latter direct and, hence, facilitate storage and handling.

The polysilane composition may be preserved in solution or in pure form, after evaporation of the solvent.

Solvents suitable for use in the compositions according to the invention are of course inert with regard to polysilanes and to the antioxidant system. They are, with advantage, non-polar solvents in which polysilane is soluble. Mention may be made, by way of example, of:

pentane, hexane, heptane and other aliphatic hydrocarbons, benzene, toluene, xylene and other aromatic hydrocarbons, tetrahydrofurane, diethyl ether, dioxane and other ethers, dichloromethane, chloroform, chlorobenzene and other chlorous hydrocarbons, and mixtures thereof.

Such solvents may be used in very variable proportions. For the purposes of the invention, there is no limit to the quantity of solvents used. In particular, stable compositions in accordance with the invention may contain 5 to 90 wt % of solvent. The ratio of solvent will advantageously be adjusted as a function of the desired viscosity for the polysilane solution.

One of the preferred compositions according to the present invention contains PVS or PVS and PMS, together with a synergic combination comprising a $C_1$ primary antioxidant, such as 2,6-di-tert-butyl-4-methylphenol (BHT) and a $C_2$ secondary antioxidant, such as dilaurylthiodipropionate (LTDP) or tri-(nonylphenyl)phosphite (TNPP).

According to another preferred method of the invention, the polysilane used in the composition is a polysilane of the PMS type combined with a crosslinking additive comprising at least two unsaturated groups or a polysilane of the PVS type combined with a crosslinking additive comprising at least two hydrogen groups.

The crosslinking additives which can be used in the compositions according to the invention are organic of organosilicic compounds, with or without a polymeric structure.

They comprise hydrogen groups and/or unsaturated groups, preferably vinyl groups, such that at least two polysilane chains may be linked together to hydrogen or olefin substituents.

By way of preferred crosslinking additives, the following compounds may be mentioned:

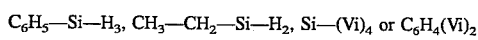

With a PVS-type polysilane containing hydrogen, or a mixture of PMS/PVS polysilanes containing hydrogen, thermal crosslinking takes place at relatively low temperatures (below 300° C.). These are hydrosilylation reactions which lead to the solidification of the product.

This crosslinking stage is essential in order to obtain high rates of conversion of the polysilane into silicon carbide, in so far as it takes place just before or during ceramisation. The crosslinking network formed favours the holding of silicon atoms in the matrix at very high temperature, which allows the mineralisation of the silicon and the carbon with a minimum loss of material.

The conversion rates observed for PVS and for PVS/PMS mixtures, of the order of 60%, signify that 40% of the initial material is lost during pyrolysis. This loss of material is due essentially to the formation of gases, such as hydrogen, methane, ethane, methylsilanes, etc. This emission of gas causes the formation of bubbles, pores and cracks which may seriously impair the mechanical properties of the final ceramic article.

The stabilisation obtained thanks to the composition according to the invention is achieved without modifying the ceramic yield on pyrolysis as concerns PMS while, as concerns PVSs, the ceramic yield can increase with the addition of an antioxidant system.

The quality of the ceramics obtained is therefore improved. This constitutes an unexpected advantage of the invention.

The processes for preparing compositions according to the invention constitute another subject-matter of the latter.

The following are also covered:

using an antioxidant system to stabilise polysilane-based compositions in air and/or at temperature, and a process for producing silicon carbide, consisting of pyrolysing stabilised compositions according to the invention in a vacuum and in an inert atmosphere.

POSSIBILITY OF INDUSTRIAL APPLICATION

Emphasis has been placed on the fact that the invention is of great interest for producing silicon carbide by ceramisation, but it should be stressed that this is not the only outlet for compositions according to the invention. They can be used in the same applications as polysilanes of the prior art. The invention, its advantages and its implementation variants are clear from the examples given below.

EXAMPLES

For all the examples 1, 2, 4 to 6, 9 to 13, the stability of the polysilane-based compositions tested, containing unsaturated groups, is given by the air stabilisation time at 25° C., corresponding to the time needed for a skin of crosslinked product to appear on the surface of a drop of polysilane composition placed on a glass sheet.

Example 1

Preparation of a Polyvinylsilane Containing Si—H Groups.

70 g sodium, 333 ml toluene and 116 ml dioxane are added to a 1-liter reaction vessel and refluxed in order to disperse the sodium. A mixture of chlorosilane (114 ml MeViSiCl$_2$, 56 ml Me$_3$SiCl, 28 ml MeHSiCl$_2$) is added all at once to the hot reaction mixture. At the end of the reaction, the polymer is isolated by a series of operations which include filtration and evaporation of the solvent. This eventually gives 85 g of a non-volatile fluid polymer material. Exposing a sample of this material to the air causes surface crosslinking in a very short time (less than 2 minutes). Pyrolysis of this polymer in an inert atmosphere at 950° C. produces a ceramic material which consists essentially, of silicon carbide, with a 62% yield.

Example 2

Preparation of a Polyvinylsilane not Containing Si—H Groups.

As in Example 1, sodium is reacted with a mixture of chlorosilanes $MeViSiCl_2$ and $Me_3SiCl$ in a ratio of 0.6 to 0.8. By filtration and by evaporating the volatile components, 66 g of a liquid product is obtained. It is observed that this product is in finitely stable in air (stability exceeding two weeks). Pyrolysis of the polymer according to Example 2 in an inert atmosphere at 950° C. leads to the formation of a ceramic material with a 22% polysilane-to-silicon carbide conversion rate.

COMMENTS:

Examples 1 and 2 show that the presence of Si—H and SiVi in polysilane is one of the factors responsible for instability in air and for the high yield of PVS polymers during pyrolysis.

Example 3

Preparing a Polymethylsilane.

As in Example 1, sodium is reacted with a chlorosilane $MeHSiCl_2$ in solution in tetrahydrofurane. After filtration and evaporation of the volatile compounds, a solid product is collected with a 65 wt % yield. Using the RNM analysis of the solid product obtained, the following formulation can be defined:

$$[(MeSi—H)_{0.6}(MeSi)_{0.4}]_x$$

On exposure to the air, this product oxidises rapidly (stability<15 min), this oxidation sometimes being accompanied by combustion. The single FIGURE shows the results obtained after qualitative infra-red analysis of the oxidation rate of this liquid PMS relative to time.

It is shown that Si—H groups contained in this polymethylsilane or PMS are at least partly responsible for its instability in air.

Example 4

Preparing a PVS-Based Composition and a Single-Component Antioxidant System.

20 mg BHT in solution in toluene are added to a 20 g sample of the polymer prepared in Example 1. A fluid product (PVS—0.1% BHT, relative to PVS), is obtained after evaporation of the solvent. It is identical in appearance to the initial material.

No surface oxidation is observed after exposure to the air for 48 hours, while oxidation appears in less than two minutes for the non-stabilised PVS in Example 1.

By pyrolysing this liquid polymer in an inert atmosphere at 950° C., a ceramic material based on silicon carbide is obtained, with a 69% yield.

On comparison with the 62% obtained in Example 1, it appears that by adding an antioxidant system in accordance with the invention, the highest ceramisation yield can be considerably increased.

Other concentrations of BHT and other antioxidants have been tested by applying the methodology of the present Example 4.

The results, expressed as the time needed for surface crosslinking (formation of a skin) to appear, are shown in Table 1 below:

TABLE 1

| ANTIOXIDANT | CONCENTRATION (%) RELATIVE TO PVS | TIME FOR CROSS-LINKING (HOURS) |
|---|---|---|
| PHENOLS | | |
| P-metboxyphenol | 0.2 | 10 |
| Hydroquinone | 0.2 | 10 |
| 3-tert-butylcatechol | 0.2 | 10 |
| BHT | 0.2 | 96 |
| BHT | 0.1 | 48 |
| BHT | 0.01 | 4 |
| BHT | 0.001 | 0.25 |
| 4,4'-methylenebis-(2,6-di-tert-butyl-4-methylphenol) | 0.2 | 96 |
| (3,5-di-tert-butyl-5-hydroxyphenyl)sulphide | 0.1 | 168 |
| IRGANOX 1010 | 0.1 | 120 |
| AMINES | | |
| Poly(2,2,3,4-tetramethyl-quinoline) | 0.1 | 0.5 |
| N-phenyl-naphthylamine | 0.1 | 0.7 |
| Phenothiazine | 0.1 | 16 |
| Bis-(2,2,6,6-tetramethyl-4-piperidinyl)sebacate | 0.1 | 12 |
| OLEFINS | | |
| Neo-alloocimene | 0.1 | 1 |

Table 1 demonstrates that several phenol-type antioxidants have an efficacy which is similar, and even superior to that of BHT and that the stabilisation time of PVS-based compositions depends on the antioxidant concentration. It is also clear from Table 1 that antioxidants other than phenols, particularly amines and olefins, can produce stabilisation.

Example 5

A Stabilised PVS Composition Containing a Bi-Component Antioxidant System.

18 ml BHT ($C_1$ primary antioxidant) and 18 mg tris-(nonylphenyl)phosphite (TNPP) ($C_2$ secondary antioxidant) in solution in toluene are added to 18 g polymer prepared as in Example 1. After evaporating the solvent, a fluid product is collected (PVS—0.1 wt % BHT—0.1 wt % TNPP; the percentages are given relative to PVS), similar in appearance to the initial material. Exposing this stabilised product to the air does not cause surface crosslinking before 300 hours.

Pyrolysis of this liquid polymer, stabilised in an inert atmosphere at 950° C., produces a ceramic material based on silicon carbide, with a remarkable 74.5% yield.

Example 6

Stabilised PVS Composition Containing a Bi-Component Antioxidant System.

Stabilised PVS compositions were prepared by following the methodology given in Example 5. The formulation of the antioxidant system was varied as was, in some cases, its concentration relative to the polysilane in question.

Table 2 below shows the antioxidant systems used, their concentrations as a percentage by weight relative to PVS and the corresponding air stability times.

TABLE 2

| $C_1$ PRIMARY ANTIOXIDANT | $C_2$ SECONDARY ANTIOXIDANT | CROSS-LINKING TIME (HOURS) |
|---|---|---|
| 0.1 BHT |  | 48 |
| 0.1 BHT | 0.1 TNPP | 300 |
|  | 0.1 TNPP | 0.1 |
| 0.1 BHT | 0.1 LTDP | 300 |
|  | 0.1 LTDP | 0.1 |

LTDP = dilaurylthiodipropionate

Table 2 demonstrates that there is significant synergy between phenols and phosphites in the air stabilisation of PVS. The combinations BHT/TNPP and BHT/LTDP have effects which are distinctly superior to the sum of the separate effects of BHT, TNPP and LTDP.

Example 7

A Stabilised PMS Composition Containing a Single-Component Antioxidant System.

580 mg of the polymer obtained in Example 3 are added to 5.8 ml BHT in solution in tetrahydrofurane. The solvent is evaporated, leaving a fluid product (PMS—1 wt % BHT relative to PMS), identical in appearance to the initial product.

When the stabilised product is exposed to air there is extremely little incorporation of oxygen (see the single FIGURE). Pyrolysis of the stabilised polymer in an inert atmosphere at 950° C. produces a silicon carbide-based ceramic material, with a 59% yield. Such a polysilane composition may be handled for a certain period in air without problems. It also appears that ceramisation is not impaired by incorporating the antioxidant system according to the invention.

Example 8

A Stabilised PMS Composition Containing a Bi-Component Antioxidant System.

580 ml of the polymer prepared in Example 3 are added to 5.8 mg of BHT and 5.8 ml of TNPP in solution in tetrahydrofurane. After evaporation of the product, a fluid product is collected (PMS—1 wt % BHT—1 wt % TNPP; the percentages being expressed relative to PMS), identical in appearance to the initial material.

As shown in the single FIGURE, exposing this polymer to air leads to even less incorporation of oxygen than that measured for PMS in Example 7.

The ceramisation yield at 950° C. in an inert atmosphere is of the order of 59%.

COMMENTS:

Examples 7 and 8 once again demonstrate the stabilising effects of the antioxidant system according to the invention with regard to a PMS-type polysilane. It may also be noted that this antioxidant system has no negative repercussions on the ceramisation yield.

Example 9

A Composition Based on a PMS—PVS Mixture.

In an inert atmosphere, a composition containing 80 wt % of the polymer obtained in Example 2 and 20 wt % of the polymer from Example 3 is prepared. When a sample of this material is exposed to air, surface crosslinking occurs in a relatively short time (5 hours).

The ceramisation yield at 950° C. in an inert atmosphere is of the order of 41%.

Example 10

A Stabilised Composition Based on a PMS—PVS Mixture, Containing a Single-Component Antioxidant System.

In an inert atmosphere, BHT dissolved in toluene is added to the composition obtained in Example 9, in a quantity such that a stabilised final composition containing 0.1 wt % BHT is obtained after evaporation of the solvent. When a sample of this material is exposed to air there is no crosslinking before 10 hours. The ceramisation yield from this composition, at 950° C. in an inert atmosphere, is 41%.

COMMENTS:

Examples 9 and 10 demonstrate the stabilising effects of the antioxidant system according the invention, with regard to polysilane mixtures. It is also clear that ceramisation is not impaired by incorporating the antioxidant system according to the invention.

Example 11

A Composition Based on PMS and a Crosslinking Additive ($SiVi_4$).

0.15 ml $SiVi_4$ are added to 1.0 g of the polymer obtained in Example 3, giving a fluid product. When the polymer is exposed to air oxygen is incorporated with surface crosslinking after 20 minutes.

The ceramisation yield at 950° C. in an inert atmosphere is of the order of 45%.

Example 12

A Stabilised PMS—$SiVi_4$ Composition Containing a Single-Component Antioxidant System.

1.0 mg of a mixture prepared in Example 11 is added to 1 mg BHT in solution in tetrahydrofurane. After evaporation of the solvent, a fluid product is corrected (PMS—0.1 wt % BHT), identical in appearance to the initial material.

When this material is exposed to air there is no crosslinking before 48 hours.

The ceramisation yield at 950° C. in an inert atmosphere is of the order of 45%.

COMMENTS:

Examples 11 and 12 demonstrate the stabilising effects of the antioxidant system according to the invention with regard to mixtures of polysilanes with an organic crosslinking additive containing olefin groups. It also appears that ceramisation is not impaired by incorporating the antioxidant system according to the invention.

Example 13

A Stabilised PMS—$SiVi_4$ Composition Containing a Bi-Component Antioxidant System.

1.0 g of a mixture prepared in Example 11 is added to 1 mg of BHT and 5.8 ml of TNPP in solution in tetrahydrofurane. The solvent is evaporated and a fluid product is collected (PMS—0.1 wt % BHT—0.1 wt % TNPP, the percentages being expressed relative to PMS), identical in appearance to the initial material. When a sample of this material is exposed to air there is no crosslinking before 96 hours.

COMMENTS:

Examples 11 to 13 demonstrate, on the one hand, the stabilising effects of the antioxidant system according to the invention with regard to mixtures of polysilanes with an organic crosslinking additive containing olefin groups and, on the other hand, the synergy, that exists between primary ($C_1$) and secondary ($C_2$) antioxidants according to the invention.

I claim:

1. A polysilane-based composition for producing silicon carbide, which comprises:

polysilane chains capable of being degraded by oxidation and the formation of polysiloxane products and/or polysilane chains suitable for being bound together directly by a reaction between Si—H and Si—X radicals, and/or indirectly through the intermediary of a crosslinking additive and by a reaction between A—X and A—H radicals, X being an olefin radical, and A being an organic, organosilicic or silicic radical;

and at least one antioxidant compound selected from the group consisting of phenol antioxidant, amine antioxidant and mixtures thereof; and said polysilane chains being stabilized in a non-crosslinked state by said antioxidant compound.

2. A composition according to claim 1, wherein the antioxidant compound is a phenol antioxidant or a mixture of phenol antioxidants.

3. A polysilane-based composition for producing silicon carbide, which comprises:

polysilane chains capable of being degraded by oxidation and the formation of polysiloxane products and/or polysilane chains suitable for being bound together directly by a reaction between Si—H and Si—X radicals, and/or indirectly through the intermediary of a crosslinking additive and by a reaction between A—X and A—H radicals, X being an olefin radical, and A being an organic, organosilicic or silicic radical;

and at least one antioxidant system wherein the antioxidant system comprises:

at least one first compound ($C_1$), which is a primary antioxidant and is a phenol, an amine, an olefin, or a mixture thereof;

at least one second compound ($C_2$), which is a secondary antioxidant and is a sulphurous product, a phosphorous-containing product, or a mixture thereof;

said polysilane chains being stabilized in a non-crosslinked state by said antioxidant system.

4. A composition according to claim 3, wherein the compound ($C_1$) is selected from the group consisting of:

hydroquinone and its derivatives;

p-methoxyphenol;

1,2-dihydroxybenzene;

6-tert-butyl-1,2-dihydroxybenzene;

2,6-di-tert-butyl-4-methylphenol (BHT) and its derivatives;

4,4'-methylenebis-(2,6-di-tert-butylphenol);

neo-allo-ocimene;

dinaphthylamine;

phenothiazine;

phenylenediamines and their derivatives;

quinoline and its derivatives;

and mixtures thereof.

5. A composition according to claim 3, wherein the sulphurous product is a product of formula:

$(R'O_2C—R'—)_nS$, $(R'_2NCS_2)_nM$, $(R'O)_2)_nM$ or $(R'OCS_2)_nM$ in which:

each R', which may be identical or different, is an aromatic, aliphatic or aralkyl organic group having 1 to 18 carbon atoms;

M is a metal;

n is less than or equal to 2.

6. A composition according to claim 5, wherein the sulphurous product is a dialkylthiodipropionate derivative or a mixture of dialkylthiodipropionate derivatives.

7. A composition as claimed in claim 5 wherein the sulphurous products are dilaurylthiodipropionate, distearylthiodipropionate, or a metallic derivative of dithiocarbamates, dithioxanthates or dithiophosphonates.

8. A composition according to claim 3, wherein the phosphorous-containing product is a product of formula:

$(R''O)_3P$, $(R''O)_3PO$, $(R''O)_2H$, or $R''O—P—R'''$ wherein each R'' which may be identical or different is an aromatic, aliphatic or aralkyl organic group having 1 to 18 carbon atoms, and R''' is a chelating group.

9. A composition according to claim 8, wherein the phosphorous-containing product is:

tris-(nonylphenyl)phosphite;

triphenylphosphite;

tris-t-butylphosphite;

catechol-mono(2,6-di-tert-butyl-4 methylphenyl)phosphite;

or a mixture thereof.

10. A composition according to claim 1, which is in solution in a solvent or a mixture of solvents.

11. A composition according to claim 1, wherein the antioxidant system is present in the composition at the rate of $10^{-5}\%$ to 10% (0.1 to $10^5$ ppm) by weight relative to the weight of polysilane(s).

12. A composition according to claim 11, wherein the antioxidant system is present in the composition at the rate of 0.01% to 1% (100 to 10,000 ppm).

13. A composition according to claim 1, wherein said polysilane is polyvinylhydrogensilane or polyalkylhydrogensilane.

14. A composition according to claim 1, wherein the crosslinking additive is an organic or organosilicic compound, with or without a polymeric structure.

15. In a process for stabilizing a polysilane-based composition comprising polysilane chains capable of being degraded by oxidation and the production of polysiloxane products, and/or polysilane chains suitable for being bound together directly by a reaction between Si—H and Si—X radicals, and/or indirectly through the intermediary of a crosslinking additive and by a reaction between A—X and A—H radicals, X being an olefin radical, and A being an organic, organosilicic or silicic radical, wherein the improvement comprises adding at least one antioxidant compound selected from the group consisting of phenol antioxidant, amine antioxidant and mixtures thereof; said polysilane chains being stabilized in a non-crosslinked state by said antioxidant.

16. A process for producing silicon carbide, which consists of pyrolyzing, in a vacuum or in an inert atmosphere, a composition according to claim 1.

17. A composition as claimed in claim 1 wherein the olefin radical comprises 1 to 18 carbon atoms.

18. A composition as claimed in claim 1 wherein the radical is a vinyl radical having the formula —CH=CH$_2$.

19. A composition as claimed in claim 4 wherein the compound ($C_1$) is BHT or one of its derivatives of the following formulae:

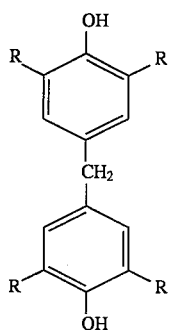

(IIb)

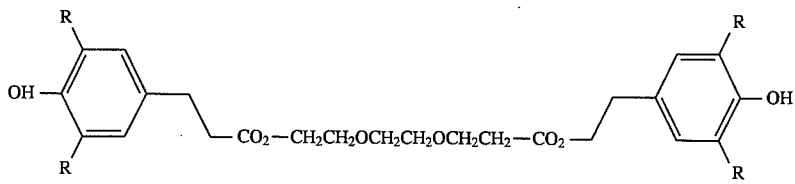

(IId)

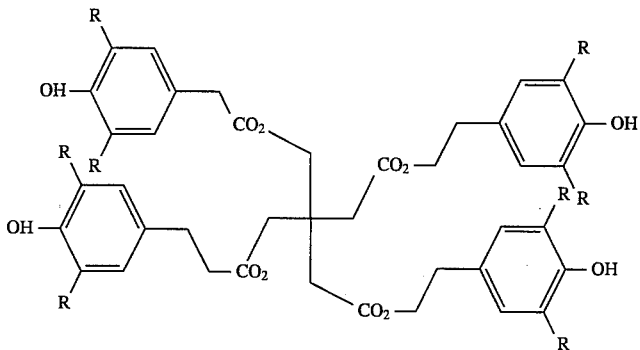

(IIe)

20. A composition as claimed in claim 5 wherein M is Ni or Zn.

21. A composition as claimed in claim 8 wherein R''' is catechol.

22. A composition as claimed in claim 9 wherein the phosphorous-containing product is tris-(nonylphenyl)phosphite.

23. A composition according to claim 14 wherein the crosslinking additive is selected from the group consisting of:

| (1) | $C_6H_6$—Si—$H_3$, | (2) | $CH_3$—$CH_2$—Si—$H_2$, |
|---|---|---|---|
| (3) | Si—$Vi_4$ | and (4) | $C_6H_6(Vi)_2$ | wherein the Vi is a vinyl radical.

24. A process for producing silicon carbide which comprises pyrolyzing, in a vacuum or in an inert atmosphere, the stabilized polysilane composition defined by claim 15.

25. A process for producing silicon carbide which comprises pyrolyzing, in a vacuum or in an inert atmosphere, the stabilized polysilane composition defined by claim 3.

26. The composition of claim 13 wherein said polysilane is polyvinylmethylhydrogensilane.

27. The composition of claim 13 wherein the polysilane is polymethylhydrogensilane.

* * * * *